US010908955B2

(12) United States Patent
Varadarajan et al.

(10) Patent No.: US 10,908,955 B2
(45) Date of Patent: Feb. 2, 2021

(54) SYSTEMS AND METHODS FOR VARIABLE RATE LIMITING OF SHARED RESOURCE ACCESS

(71) Applicant: Honeywell International Inc., Morris Plains, NJ (US)

(72) Inventors: Srivatsan Varadarajan, St. Louis Park, MN (US); Larry James Miller, Black Canyon City, AZ (US); Chittaranjan Kashiwar, Bangalore (IN); Pavel Zaykov, Brno (CZ)

(73) Assignee: Honeywell International Inc., Charlotte, NC (US)

( * ) Notice: Subject to any disclaimer, the term of this patent is extended or adjusted under 35 U.S.C. 154(b) by 191 days.

(21) Appl. No.: 15/928,656

(22) Filed: Mar. 22, 2018

(65) Prior Publication Data

US 2019/0294472 A1 Sep. 26, 2019

(51) Int. Cl.
*G06F 9/50* (2006.01)
*G06F 9/54* (2006.01)
*G06F 9/48* (2006.01)
*G06F 13/40* (2006.01)

(52) U.S. Cl.
CPC .......... *G06F 9/5011* (2013.01); *G06F 9/4881* (2013.01); *G06F 9/4887* (2013.01); *G06F 9/544* (2013.01); *G06F 13/4068* (2013.01)

(58) Field of Classification Search
CPC .... G06F 9/5011; G06F 9/4881; G06F 9/4887; G06F 9/544; G06F 13/4068; G06F 9/468
See application file for complete search history.

(56) References Cited

U.S. PATENT DOCUMENTS

| 7,302,685 | B2 | 11/2007 | Binns et al. |
| 7,996,644 | B2 * | 8/2011 | Kottapalli ............. G06F 12/084 |
| | | | 711/128 |
| 8,943,287 | B1 | 1/2015 | Miller et al. |
| 9,465,664 | B1 | 10/2016 | Miller |
| 9,639,401 | B1 | 5/2017 | Bertram et al. |

(Continued)

FOREIGN PATENT DOCUMENTS

| CN | 103544065 A | 1/2014 |
| CN | 103544065 B | 2/2017 |

OTHER PUBLICATIONS

DDC-I, "Deos, a Time & Space Partitioned, Multi-core Enabled, DO-178 DAL A Certifiable RTOS", "https://www.ddci.com/products_deos/", Retrieved on Dec. 13, 2017, pp. 1-4, Publisher: DDC-I, Inc., Published in: AZ.

(Continued)

*Primary Examiner* — Shanto Abedin
*Assistant Examiner* — Bruce S Ashley
(74) *Attorney, Agent, or Firm* — Fogg & Powers LLC (57) ABSTRACT

A method is provided. The method comprises: commencing a time window, where the time window has a fixed or variable time duration; determining a shared resource access quota for at least one time partition for the time window, where the shared resource access quota may vary by time window; allocating each determined shared resource access quota to a corresponding time partition for the window; determining if allocated shared resource access quota for any time partition in the time window has been met or exceeded; and if an allocated shared resource access quota for a time partition in the time window has been met or exceeded, then halting an executing process in the time partition.

17 Claims, 6 Drawing Sheets

(56) References Cited

U.S. PATENT DOCUMENTS

| | | | |
|---|---|---|---|
| 2003/0088606 A1 | 5/2003 | Miller et al. | |
| 2003/0101084 A1* | 5/2003 | Otero Perez | G06F 9/4881 |
| | | | 718/105 |
| 2006/0179196 A1 | 8/2006 | Gray | |
| 2008/0086734 A1* | 4/2008 | Jensen | G06F 9/4881 |
| | | | 718/104 |
| 2009/0217280 A1* | 8/2009 | Miller | G06F 9/52 |
| | | | 718/104 |
| 2012/0051369 A1* | 3/2012 | Bryan | H04L 12/43 |
| | | | 370/458 |
| 2014/0208331 A1* | 7/2014 | Li | G06F 9/5044 |
| | | | 718/105 |
| 2016/0283272 A1* | 9/2016 | Coleman | G06F 9/5016 |
| 2016/0364267 A1* | 12/2016 | Varadarajan | G06F 9/4812 |

OTHER PUBLICATIONS

Rose, "Memory Partitioning and Slack Scheduling Boost Performance in Safety-Critical Applications", "http://www.electronicdesign.com/embedded/memory-partitioning-and-slack-scheduling-boost-performance-safety-critical-applications-0", Dated Aug. 26, 2014, Retrieved Dec. 13, 2017, pp. 1-17.
European Patent Office, "Extended European Search Report from EP Application No. 19164199.2 dated Jul. 18, 2019", from Foreign Counterpart to U.S. Appl. No. 15/928,656, pp. 1-9, Published: EP.
European Patent Office, "Communication pursuant to Article 94(3) from EP Application No. 19164199.2", from Foreign Counterpart to U.S. Appl. No. 15/928,656, dated Jun. 29, 2020, p. 1 through 7, Published: EP.

\* cited by examiner

SYSTEMS AND METHODS FOR VARIABLE RATE LIMITING OF SHARED RESOURCE ACCESS

BACKGROUND

Modern systems utilize software applications (applications) executed on Real-Time Operating Systems (RTOSs) and multicore processing systems. For the purposes of this document, each application comprises one or more partitions, and each partition comprises one or more processes, where a process may otherwise be referred to as a task or a thread. The multicore processing system is a computer including a multicore processor, e.g. a multicore microprocessor or digital signal processor, having two or more cores. Examples of multicore processors include multicore ARM advanced RISC machine, IBM PowerPC, and Intel and Advanced Micro Devices X86 processors. Alternatively, multicore processors can be implemented in field programmable gate arrays (FPGAs) such as those manufactured by Xilinx. Each core typically includes a processor and cache memory. The multicore processing system also comprises interconnects (fabrics), cache memory, memory controllers, data bus(es), and main memory which are shared resources utilized by each core in the multicore processing system.

Because each core uses the same shared resources, an application's processes executed on one core can have a detrimental increase the execution time of another application's processes executing on another core. Shared resource access includes reading from cache memory or main memory, and writing to cache memory and/or main memory. For example, because cores of a multicore processor utilize shared resources, an application's process running on one core can increase, e.g. by in excess of a factor of four times, the execution time of other application's process(es) running on other core(s). An application process writing to cache or main memory can have a greater detrimental effect on execution time of other application's process(es) than reading from cache or main memory or vice versa.

In safety critical systems, an application executed on a core may need to perform a process within a maximum execution time for every period. To avoid exceeding the maximum time or being less than the desired rate, either one or more other cores in the multicore processor must be disabled or the usage of shared resources by other application's process(es) being executed on the other core(s) must be bandwidth or time limited. Because the former option is undesirable as it precludes the benefits of a multicore processor, the latter option is preferred.

The use of a token bucket for each core has been proposed in U.S. Pat. No. 8,943,287, which is hereby incorporated by reference in its entirety, to time limit shared resource access by each core in a multicore processor. The use of a token bucket for each core, which is based upon elapsed time, limits peak shared resource access for each core to avoid the detrimental impact described above. However, because a token bucket for each core requires the use of the same shared resource access quota for every time window, the use of a token bucket for each core requires conservative time budgets for shared resource access by each core. As a result, the multicore processing system using this technique exhibit lower processing efficiency, i.e. take longer to execute processes and their corresponding applications. Therefore, there is a need for systems and methods that facilitate less conservative budgets for shared resource access for each core of a multicore processor in a multicore processing system.

SUMMARY

A method is provided. The method comprises: commencing a time window, where the time window has a fixed or variable time duration; determining a shared resource access quota for at least one time partition for the time window, where the shared resource access quota may vary by time window; allocating each determined shared resource access quota to a corresponding time partition for the window; determining if allocated shared resource access quota for any time partition in the time window has been met or exceeded; and if an allocated shared resource access quota for a time partition in the time window has been met or exceeded, then halting an executing process in the time partition.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

In order to provide increased processing efficiency in multicore processors, a variable rate limiting technique is used in a time partitioned system. Embodiments of the present invention allow for varying allocated shared resource quotas per core during different time windows, and therefore increase processing efficiency.

Time partitions are intervals of time where the execution of application's process(es) on one core in one time partition will not affect the execution of process(es) on the same or another core in another time partition.

For pedagogical reasons, the invention shall be described herein with respect to a processing unit that is a core (including a virtual core) of a multicore processor, and a processing system that is multicore processing system. Therefore, the multicore processor is just one type of processing unit; the multicore processing system is just one type of processing system. However, the invention is applicable generally to a processing system having multiple processing units. The term "processing unit", as used herein, generally refers to a computational device, which may also be a central processing unit (CPU) (e.g. an Intel Core Processor) or digital signal processor (DSP) (e.g. a Texas Instruments C series DSP), capable of accepting data and performing mathematical and logical operations as instructed by program instructions. CPUs and/or DSPs can also be implemented by field programmable gate arrays and/or application specific integrated circuits. A processing unit, whether a CPU, DSP, or core thereof, is implemented by electronics circuitry, and may also referred to herein as a processing circuit.

In one embodiment, where the processing system includes multiple processing units, the multiple processing units may be part of a multi-CPU and/or DSP system, a set of cores in a multicore CPU or DSP, and/or a set of real and virtual CPU or DSP cores that perform hyper- or simultaneous multi-threading. Thus, for example, the multiple processing units may be a multi-CPU or DSP system, where the different CPUs or DSPs in the multi-CPU or DSP processing system have multiple cores.

Time partitioning facilitates meeting time guarantees at a process level as well as time window level. For example, critical applications executed on multicore processing systems using a real time operating system (RTOS), e.g. in aerospace systems, rely upon the concept of time partitioning to certify that processes execute within a worst case execution time.

During specific time partitions, specific processes are executed. Each time partition occurs during a time window having a corresponding time period. One or more processes are executed by a core during a single time window.

A time window may be a fixed time window having a fixed time period, or a sliding time window having a variable time period. A sliding time window is able to adjust the start (or commencement) time of the time window such that the processes execute at an earlier moment in time while still maintaining time determinism. Partitioning and time windows, particularly sliding windows are described in further detail in U.S. Patent Publication No. 2016/0364267, entitled "Systems and Methods for Scheduling Tasks Using Sliding Time Windows", which was filed on Jun. 11, 2015 (hereinafter the "'267 Application"). The '267 Application is incorporated herein by reference in its entirety. When embodiments of the invention implement sliding time windows, time may be reserved for execution of interrupt service routines. Further, slack scheduling may also be performed to permit full utilization on all cores.

The same time partition can be repeated, sequentially or non-sequentially, during different time windows having the same or different time periods. The same time partition can be executed on different cores during different or the same time windows. The time partition can span one or more cores; in this embodiment, a shared resource access quota (subsequently described) can be allocated to the group of cores (if there is more than one) or to each core in the group.

Applications, processes, time partitions, and time windows may conform to the ARINC 653 standard. The ARINC 653 standard sets forth specifications for Real Time Operating System (RTOS) interfaces for partitioning computer resources in the time and space domains, and for Application Program Interfaces for abstraction of an application from underlying hardware and software.

A shared resource quota is specified for each time partition for a core or a group of cores. Shared resource quota means a number of accesses to shared resources, or another type of measure of the number of accesses to the shared resources. Examples of other types of measures of the number of accesses to the share resources include a time filtered value (e.g. an average over a time period) of shared resource accesses, and a rate of shared resource accesses per unit time. Shared resources comprise interconnects (fabrics), cache memory, memory controllers, data bus(es), and main memory. Shared resources may optionally comprise at least one input/output (I/O) controller, and at least one I/O (e.g. direct memory access circuitry, memory circuitry, and/or counter circuitry). Accesses means utilization of shared resources, e.g. reading or writing to cache or main memory. The shared resource quota can be fixed or variable for time partitions corresponding to different time intervals for the same core, and for the same time interval for different cores.

Different time partitions on the same core can have identical or different quota sizes. The same partition occurring in different time windows on the same core can have identical or different quota sizes. The same partition occurring in different time windows on different cores can have identical or different quota sizes.

Figure 1:
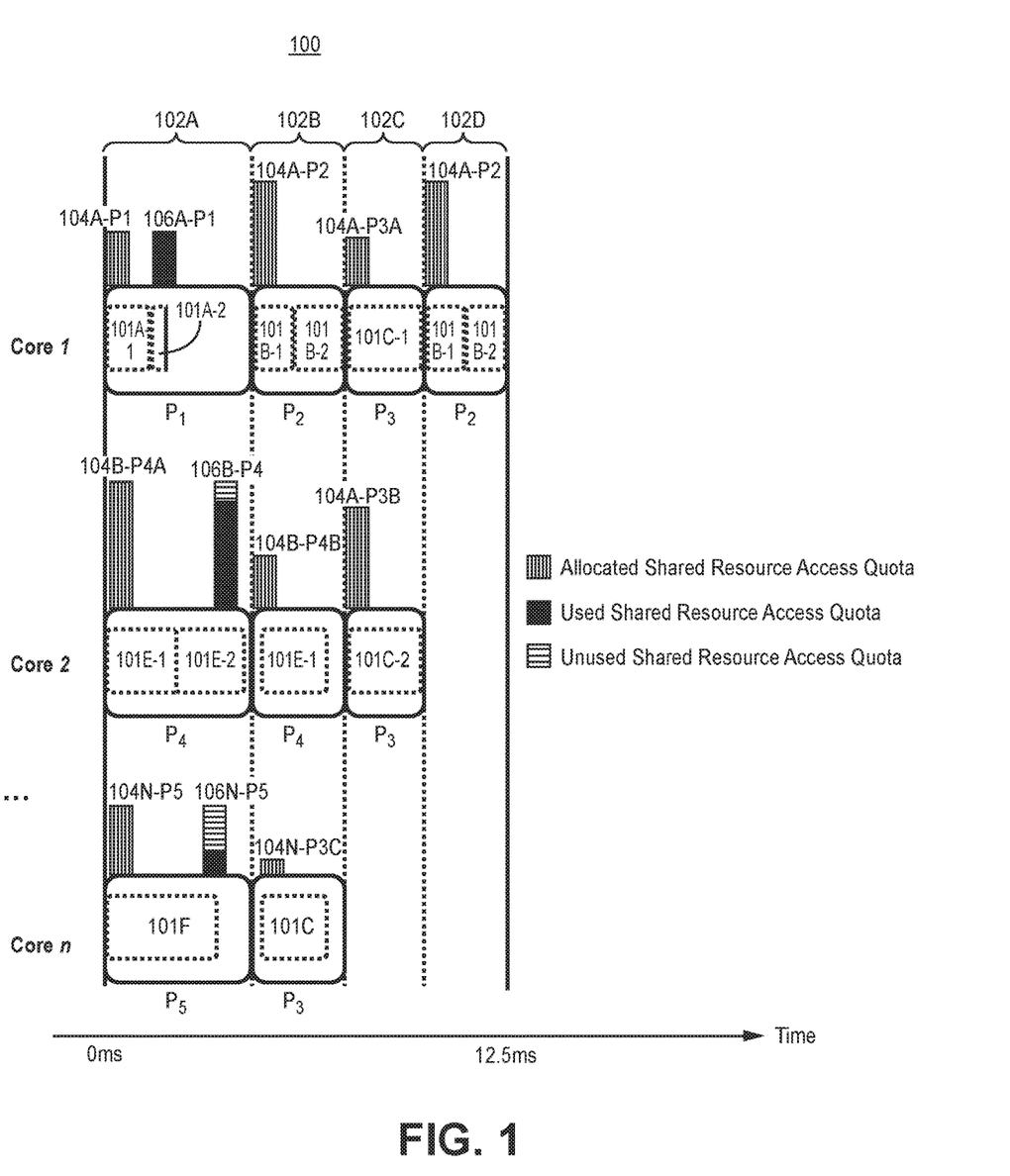
FIG. 1 illustrates a diagram of one embodiment of shared resource access throttling in a time partitioned multicore processor.

FIG. 1 illustrates a diagram of one embodiment of shared resource access throttling in a time partitioned multicore processor 100. The diagram includes multiple time windows 102A-102D, time partitions $P_1$-$P_5$, and processes 101A-1-101F. One or more processes are executed during a time partition. The process(es) in a time partition may complete execution prior to the end of the time window corresponding to the time partition. The process(es) executed during a time partition in different time windows need not be the same.

For purposes of clarity, FIG. 1 illustrates the execution of processes during the first time window 102A. However, for the second through fourth time windows 102B, 102C, 102D, only the allocated shared resource access quotas are illustrated.

The first core (Core 1) executes processes of time partitions $P_1$, $P_2$, $P_3$, and $P_2$ respectively in the first time window 102A, the second time window 102B, the third time window 102C, and the fourth time window 102D. The second core (Core 2) executes processes of time partitions $P_4$ and $P_3$, respectively in the first time window 102A and the second time window 102B, and the third time window 102C. The Nth core (Core N) executes processes of time partitions $P_5$ and $P_3$, respectively in the first time window 102A and the second time window 102B.

For each core, a time partition may exist within a corresponding time window. The time period of each time window is coincident with the time period of the time partition in the corresponding time window. A time partition, e.g. $P_2$, $P_3$, and $P_4$, can occur in more than one time window and in more than one core. As illustrated for time partition $P_4$, the time period of two time windows including the same time partition need not be the same.

Each time partition of a time window is assigned a shared resource quota $104x$-$y$. The multicore processor, the operating system of the multicore processing system, and/or another component of the multicore processing system assign the shared resource quota. The shared resource quota may vary by time partition, and may vary for the same time partition in different time windows. For example, each of the illustrated time partitions P3 are respectively assigned different shared resource access quotas 104A-P3A, 104A-P3B, 104A-P3C. During each time window and for each time partition, the multicore processor, the operating system of the multicore processing system, and/or another component of the multicore processing system, determines whether the shared resource access quota of any of the time partitions has been met or exceeded by the process(es) of the corresponding time partitions. Components of the multicore processing system include the multicore processor, the operating system, and optionally an abstraction layer, such as a platform abstraction layer, that provides an application programming interface that is independent of the underlying hardware. The abstraction layer may be part of or independent from the operating system. If process(es) of a time partition have requested shared resource accesses equal to or in excess of the time partition's shared resource access quota, then the execution of the process executing when that threshold has been crossed is throttled, i.e. terminated, and no further processes of the same time partition are executed.

For example, as illustrated by shared resource access quota 106A-P1, in time partition P1, process 101A-2 requested shared resources equal to or in excess of that partition's shared resource access quota while the first core (Core 1) was executing that process. As a result, although the execution on the first core of preceding process 101A-1 was completed, the execution of process 101A-2 on the first core was terminated before completion and the execution of any subsequent process(es) in time partition are not begun.

For example, as further illustrated by shared resource access quotas 106B-P4 and 106N-P5, time partitions $P_4$ and $P_5$ have respective shared resource access quotas that are not exceed by the respective processes executed in each time partition. In fact, in these examples, some of the shared resource access quota for each time partition went unused. Alternatively, it is possible that process(es) of a time partition may utilize shared resource access exactly equal to the shared resource access quota of the time partition.

Figure 2A:
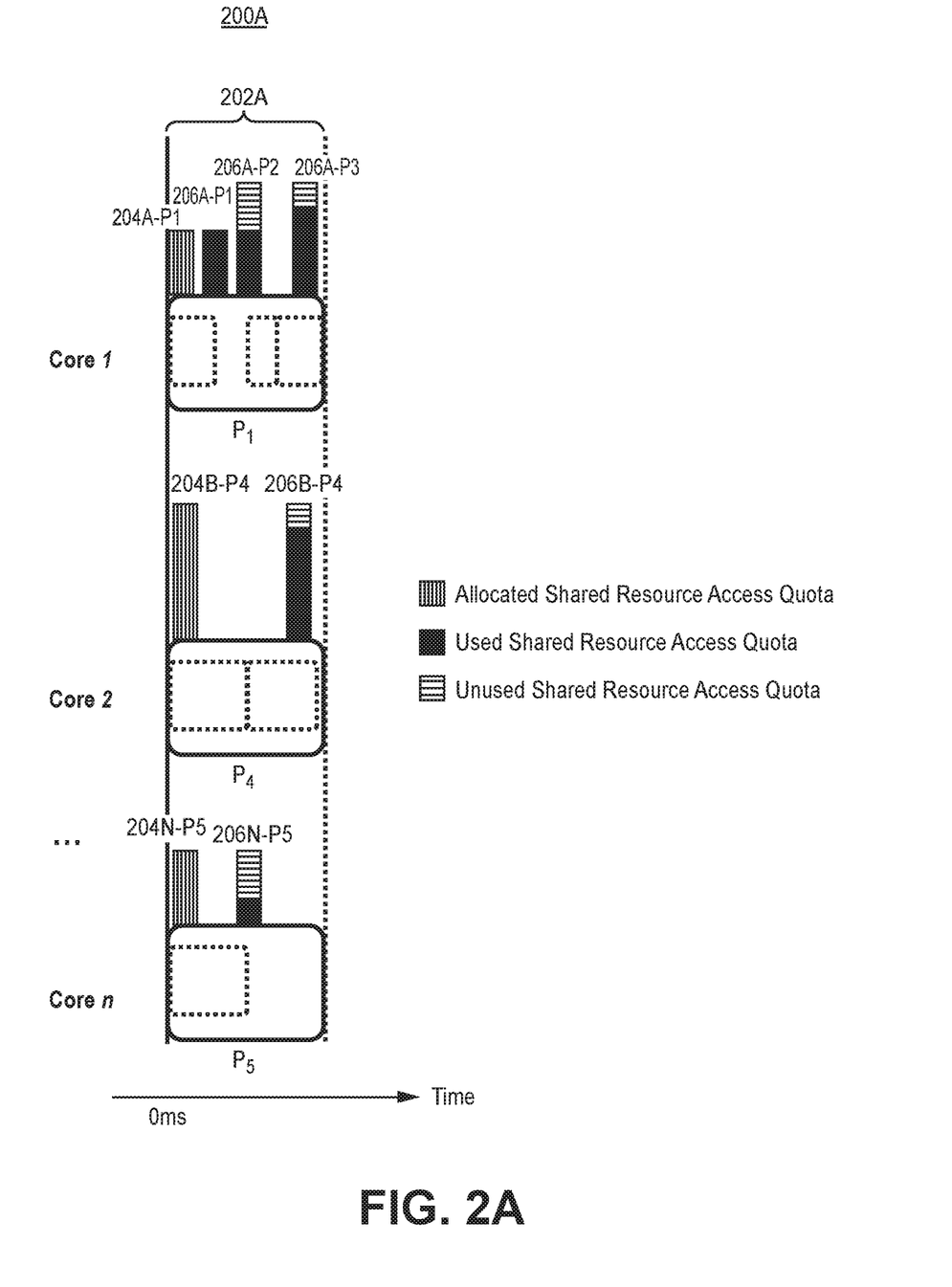
FIG. 2A illustrates a diagram of one embodiment of quota throttling and unthrottling in a time partitioned multicore processor.

FIG. 2A illustrates a diagram of one embodiment of quota throttling and unthrottling in a time partitioned multicore processor 200A. Unthrottling means releasing from a throttled condition. If process(es) in a first time partition in one time window finish execution before process(es) in one or more other time partitions in the same time window, then the unused portion of the shared resource access quota (unused shared resource access quota or USRQ) of the first time partition is made available to at least one other time partition in the same time window that has exceeded its shared resource access quota.

The first core executes processes of time partition $P_1$ in the first time window 202A. The second core executes processes of time partition $P_4$ in the first time window 202A. The nth core executes processes of time partition $P_5$ in the first time window 202A.

For example, as illustrated in FIG. 2A, time partitions $P_4$ and $P_5$ in the first time window 202A respectively have shared resource access quotas 204B-P4 and 204N-P5. The shared resource access quotas 204B-P4 and 204N-P5 are not consumed as reflected by 206B-P4 and 206N-P5. However, as illustrated by 206A-P1, the shared resource access quota 204A-P1 is consumed during or by the execution of a process, e.g. by the execution of the first process, of time partition $P_1$. Normally, the second process and the third process of time partition $P_1$ would be respectively terminated and not commenced. However, because the process(es) of time partition $P_5$ concluded prior to the processes of time partition $P_1$ meeting or exceeding the shared resource access quota of time partition $P_1$, the multicore processing system transfers the unused shared resource access quota to time partition $P_5$ in the same time window. Time partitions can only transfer unused shared resource access quotas, or portions thereof, to other time partitions in the same time window.

As illustrated, with the transferred shared resource access quota, the increased shared resource access quota 206A-P2 is sufficient so that the processes of time partition $P_1$ complete execution with the increased shared resource access quota having an unused portion of shared resource access quota 206A-P3. Thus, in this embodiment, a multiprocessor system or component(s) thereof evaluate—when a process of a partition during a time window has consumed all of the shared resource access quota assigned to the time partition during the time window—if at least one other time partition in the same time window has unused shared resource access quota. If so, then some or the entire unused shared resource access quota is transferred from the at least one other time partition to the time partition whose shared resource access quota has been consumed.

In an optional embodiment, if the transferred unused shared resource access quota was insufficient, additional unused shared resource access quota can be shared from another time partition in the same time window, e.g. from time partition $P_4$ which subsequently has an unused portion of shared resource access quota 206B-P4. If no or insufficient unused shared resource access quota is available, then processes executing are terminated, and processes which have not been executed are not executed.

Figure 2B:
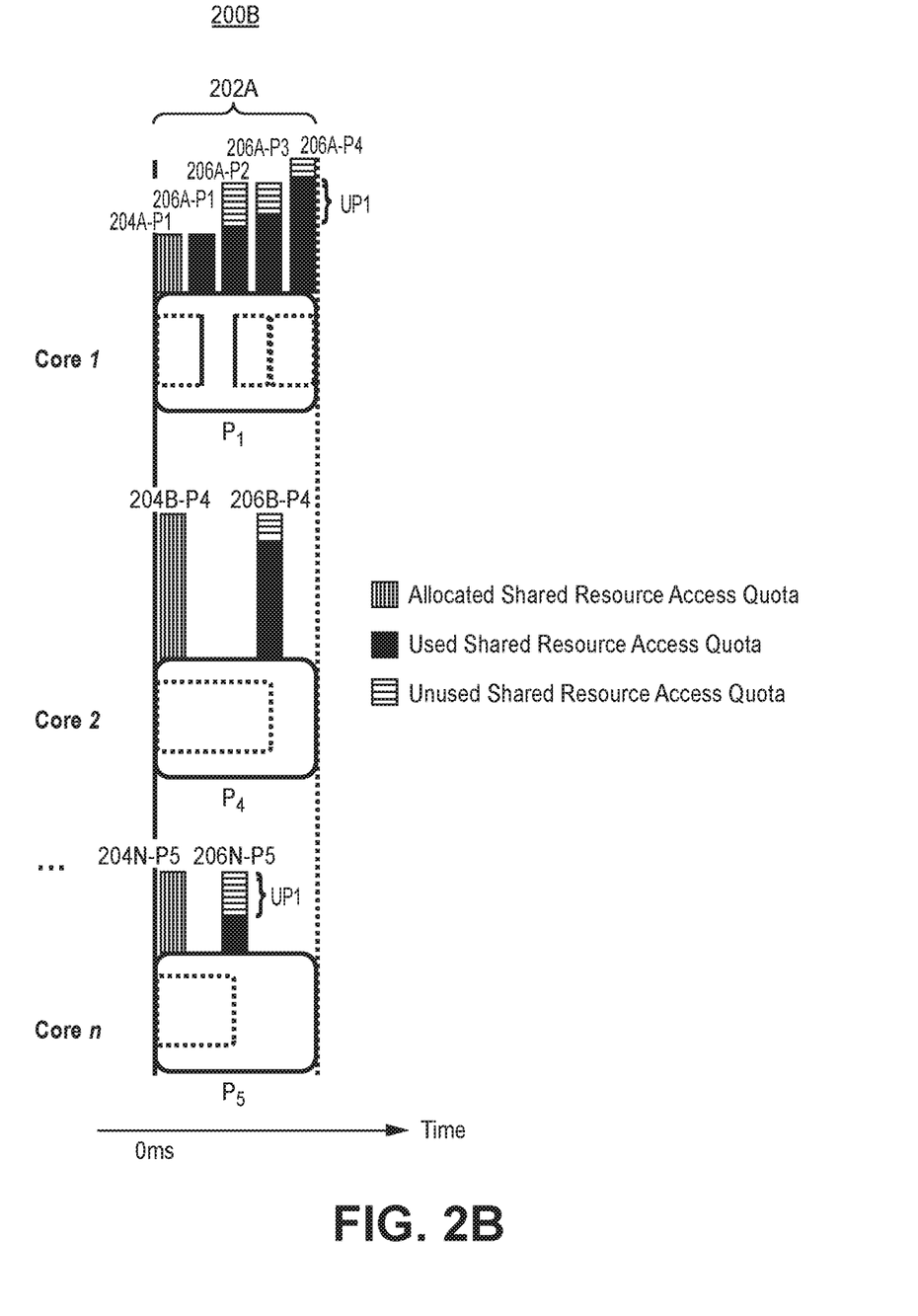
FIG. 2B illustrates a diagram of another embodiment of quota throttling and unthrottling in a time partitioned multicore processor.

FIG. 2B illustrates a diagram of another embodiment of quota throttling and unthrottling in a time partitioned multicore processor 200B. In this optional embodiment, process (es) of a time partition in a time window are terminated and possibly not executed because no unused shared resource access quota is available to be transferred from another time partition in the same time window. However, at some later time, before the time window terminates, process(es) complete execution in one or more other time partitions leaving unused shared resource access quota, then all or some of the unused shared resource access quota can be transferred to the time partition so that its process(es) can restart (or re-commence) and execute during the remaining time in the time window.

For example, as illustrated in FIG. 2B, the process(es) of time partition $P_1$ cease, or are halted or suspended, because the first process has consumed, e.g. upon completion of its execution, the shared resource access quota 206A-P1 allocated to time partition $P_1$ during the first time window 202A. Subsequently, process(es) of time partition $P_5$ complete execution in the first time window 202A, and has an unused portion UP1 of shared resource access quota 206N-P5. The unused portion UP1 of shared resource access quota 206N-P5 is transferred to time partition $P_1$, and the uncompleted process(es), i.e. processes that were suspended and/or not executed, can be executed during the first time window 202A at least until the transferred unused portion of the shared resource access quota 206N-P5 is consumed by the uncompleted process(es) or the first time window 202A terminates. For example, in the event shared resource access quota 206A-P2 otherwise had insufficient shared resource access quota to complete corresponding process(es), the transferred unused portion UP1 can be used by shared resource access quota 206A-P2 (and subsequent shared resource access quotas, e.g., 206A-P3 and 206A-P4) to facilitate such completion. Unused shared resource access quota may be transferred to a time partition (or a USRQ cluster as described below) prior to or when the time partition (or the USRQ cluster) requires the unused shared resource access quota.

Subsequently, process of time partition $P_4$ completes execution in the first time window 202A, and has unused shared resource access quota 206B-P4. The unused shared resource access quota 206B-P4 is transferred to time partition $P_1$ so that it can be utilized by process(es) being and to be executed in time partition $P_1$ during the first time window 202A, i.e. processes that were halted/or not executed, can be resumed and/or executed for the first time at least until the transferred unused shared resource access quota 206B-P4 is consumed by the uncompleted process(es). FIG. 2B illustrates a process being halted in time partition $P_1$, and then being resumed or recommenced upon the transfer of unused shared resource access quota to that time partition. Other time windows may sequentially follow the first time window 202A.

Figure 2C:
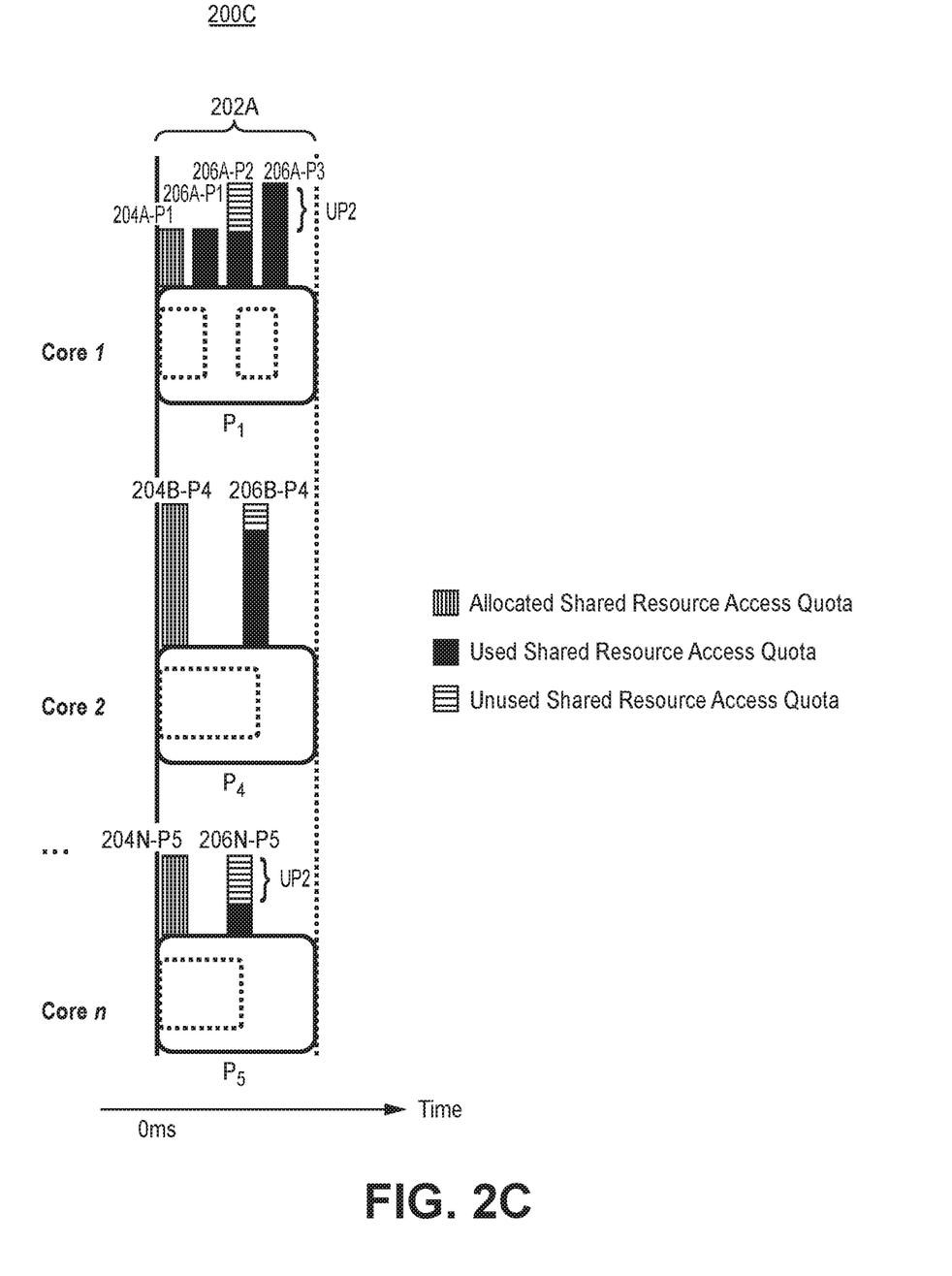
FIG. 2C illustrates a diagram of a further embodiment of quota throttling and unthrottling in a time partitioned multicore processor.

FIG. 2C illustrates a diagram of a further embodiment of quota throttling and unthrottling in a time partitioned multicore processor 200C. In this optional embodiment, time partitions whose processes are executed by cores can be clustered in one or more USRQ clusters, and unused shared resource access quota of a USRQ cluster can only be shared with one or more other time partitions in the same USRQ cluster.

In another optional embodiment, each USRQ cluster has a corresponding pool of unused shared resource access quota which can be made available to time partitions of cores in different USRQ clusters during the same time window, but only when there is no need for the unused shared resource access quota in the USRQ cluster contributing the unused shared resource access quota. During each time window, contributions to each pool of available unused shared resource access quota are made by time partitions of the corresponding USRQ cluster. When unused shared resource access quota becomes available, e.g. in the pool, within a USRQ cluster during a time period, time partitions in the USRQ cluster are assigned the unused shared resource access quota according to a policy.

The policy may be static and/or dynamic. Thus, unlike a static policy, a dynamic policy may change with time. In a static policy, groups of USRQ clusters and/or partitions within USRQ cluster(s) of one or more time partitions are assigned priority levels of different ranks. Available unused shared resource access is distributed between or within each group based upon rank, e.g. from higher to lower rank or vice versa. For example, time partitions in the highest ranked USRQ cluster that require additional shared resource allocation quota can utilize as much of the available shared resource allocation quota that is available during the corresponding time window; lower ranked time partitions only receive any remaining available shared resource allocation quota during the time window upon the process(es) of the highest ranked time partition(s) completing execution prior to the end of the time window. Thus, if processes of any lower ranked time partitions were suspended, such processes resume execution only upon receiving additional shared resource allocation quota.

Alternatively, for a dynamic policy, the rankings of the groups and/or the time partition constituents of one or more groups may vary over time. Examples of static policies include providing available unallocated shared resource access to the first or last suspended time partition in a time window, and to the time partition or USRQ cluster in a time window having the lowest assigned shared resource allocation quota. Additionally, the partition or USRQ cluster selected to receive unused quota could be the one with the first suspended partition, last suspended partition, partition with a lowest quota, partition with a highest quota, partition with a lowest time budget, partition with a highest time budget, partition with the least remaining time budget to be completed within the window, and/or the partition with the highest execution time with budget.

For example, as illustrated in FIG. 2C, the process(es) of time partition $P_1$ ceases because a first process has consumed, e.g. upon completion of its execution, the shared resource access quota 206A-P1 allocated to time partition $P_1$ during the first time window 202A. Subsequently, processes of time partition $P_5$ completes execution in the first time window 202A, and has unused shared resource access quota 206N-P5. Time partition $P_1$ and $P5$ and core n are members of a USRQ cluster; however, time partition $P_4$ is not a member of the USRQ cluster. Thus, the unused portion UP2 of shared resource access quota 206N-P5 is transferred to time partition $P_1$, and the uncompleted process(es), i.e. processes that were suspended and/or not executed, can be resumed and/or executed during the first time window 202A at least until the transferred unused portion UP2 of the shared resource access quota 206N-P5 is consumed by the uncompleted process(es) or the first time window 202A terminates. For example, in the event shared resource access quota 206A-P2 otherwise had insufficient shared resource access quota to complete corresponding process(es), the transferred unused portion UP2 can be used by shared resource access quota 206A-P2 (and subsequent shared resource access quotas, e.g., 206A-P3) to facilitate such completion. Subsequently, a process of time partition $P_4$ completes execution in the first time window 202A, and has unused portion of shared resource access quota 206B-P4. However, the unused portion of shared resource access quota 206B-P4 cannot be transferred to time partition $P_1$ because it is not a member of the USRQ cluster. In the illustrated embodiment, the processes of time partition $P_1$ during the first time window 202A consume all of allocated shared resource access quota 206A-P3. Thus, the process being executed at that time in time partition $P_1$ during the first time window 202A is terminated or suspended, and any other remaining processes to be executed are not executed.

In an optional embodiment, unused shared access quota in one USRQ cluster may be transferred to another USRQ cluster. In this embodiment, if all processes of all time partitions (corresponding to cores of a USRQ cluster) in a time window have completed execution, a total unused shared access quota, if any, of the time partitions can be transferred to time partitions of one or more other USRQ clusters. In another optional embodiment, for the foregoing embodiments utilizing USRQ clusters, allowing the transfer of unused shared resource access quota can be selectively enabled and disabled. In a further optional embodiment, for any of the foregoing embodiments or any other embodiment, allowing the transfer of unused shared resource access quota to any or all of the N cores can be selectively enabled and disabled by the multiprocessor system or component(s) thereof for any of the aforementioned options.

Figure 3:
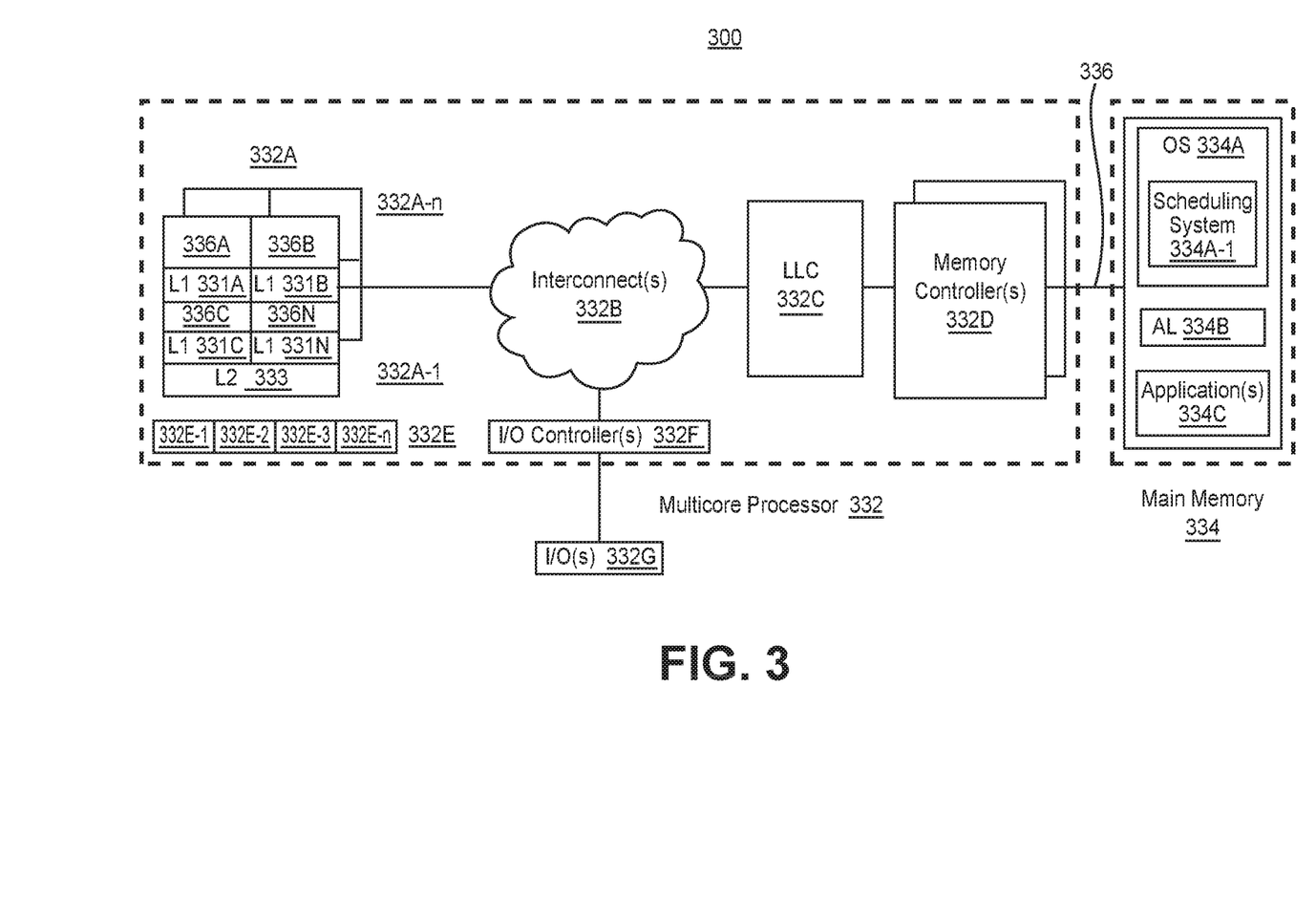
FIG. 3 illustrates a block diagram of one embodiment with a multicore processor computing system configured to implement shared resource access throttling.

FIG. 3 illustrates a block diagram of one embodiment with a multicore processor computing system configured to implement shared resource access throttling (multicore processor computing system) 300. The multicore processor computing system 300 may generally be implemented in embedded systems, standard computing systems, and other implementations known to one having skill in the art.

In the embodiment illustrated in FIG. 3, the multicore processor computing system 300 comprises a multicore processor 332 coupled to main memory 334 by a data bus (bus) 336, and at least one event counter (event counter(s)) 332E per core, and optionally per USRQ cluster. Optionally, the data bus 336 is implemented, for example, in part with a Northbridge integrated circuit, and according to a standard such as a JEDEC standard.

Optionally, the main memory 334 is dynamic random access memory (DRAM). Optionally, the main memory 334 includes ranks of memory, and each rank includes banks of memory. In one embodiment, the main memory 334 stores an operating system (OS) 334A and at least one application (application(s)) 334C. The operating system 334A may be an operating system like Windows or a real time operating system such as Honeywell International Inc.'s Deos™ operating system. The operating system 334A, which is executed by the multicore processor 332, provides an interface between the multicore processor computing system 300 and the application(s) 334C. The application(s) 334A are executed on the multicore processor 332, and for example may be avionics applications such as a flight management system. Optionally, the main memory 334 stores an application layer 334B which is executed by the multicore processor.

The event counter(s) 332E are implemented in registers, e.g. performance monitoring counters in X86, PowerPC, and ARM processor architectures, or in an application specific integrated circuit or programmable logic such as a gate array. Optionally, the event counters count the number of shared resource accesses (e.g. read and write accesses) made by each core, and optionally by USRQ cluster, during a time window. Optionally, additionally or alternatively, the event counter(s) 332E may record during a time window for each core (and optionally for each USRQ cluster) more detailed parameter values related to shared resource access such as the number of transactions for different types of memory transactions (e.g. the number of read accesses and the number of write accesses), cache misses (e.g. number misses of L2 cache 333 and/or last level cache 332C), and/or bus cycles (cycles of the data bus 336).

In one embodiment, the event counter(s) 332E are monitored by shared resource access evaluation hardware in the multicore processor 332 (e.g. dedicated logic that is part of the event counter(s) 332 or elsewhere in the multicore processor 332) and/or by shared resource access evaluation software (e.g. part of the optional abstraction layer 334B). Such shared resource access evaluation hardware and/or software calculates the shared resource access of a time partition of a core during a time window, and determines whether the calculated shared resource access has met or exceeded the corresponding allocated shared resource access quota. If the allocated shared resource access quota has been met or exceeded then the shared resource hardware and/or software issues an interrupt to the corresponding core, and/or uses polling, so that the corresponding time partition is not able to perform any further shared resource accesses during the current time partition, unless as described above, the shared resource access quota is increased. Optionally, such shared resource access evaluation hardware and/or software varies the rate at which it performs the aforementioned calculation and determination based upon whether the allocated shared resource access quota less the calculated shared resource access is less than or equal to one or more threshold levels. The change in rate increases as the threshold level decreases. Optionally, a hardware and/or software timer, e.g. in the shared resource access evaluation hardware and/or software may be used to implement the foregoing.

Optionally, such shared resource access evaluation hardware and/or software determines and/or stores the shared resource access quotas of time partitions including the processes of allocated unused shared resource access quota from one time partition associated with one core to another time partition associated with another core. Optionally, such shared resource access evaluation hardware and/or software determines and/or stores the shared resource access quotas of USRQ clusters including the processes of allocated unused shared resource access quota from USRQ cluster to another USRQ cluster.

In the embodiment illustrated in FIG. 3, the multicore processor 332 comprises at least one USRQ cluster (USRQ cluster(s)) 332A, at least one interconnect (interconnect(s)) 332B, and at least one memory controller (Memory Controller(s)). Optionally, the multicore processor comprises at least one last level cache (LLC) e.g. L3 cache, 332C and/or at least one I/O controller (I/O controller(s)) 332F. In one embodiment, the USRQ cluster 332 and the interconnect(s) 332B are co-fabricated on a semiconductor die. In an alternative embodiment, the last level cache 332B and/or the memory controller(s) 332D are also co-fabricated on the semiconductor die.

The USRQ cluster(s) 332A comprise one or more USRQ clusters 332A-1 . . . 332A-n. Each USRQ cluster includes at least one processing core or core 336A . . . 336N, e.g. used in the microprocessors described herein. Optionally, each USRQ cluster includes a level one cache (L1) 331A . . . 336N each of which is associated with and coupled to a unique core. Optionally, each USRQ cluster includes a level two cache L2 333 which is coupled to each core and level one cache in the USRQ cluster.

The USRQ cluster(s) 332A are coupled by the interconnect(s) 332B to the last level cache 332C. Optionally, the interconnect(s) 332B are implemented herein as a ring, a fabric or mesh, or a bus. Optionally, the cache described herein are implemented with synchronous dynamic random access memory (SDRAM) and/or embedded dynamic random access memory (eDRAM).

The memory controller(s) 332D contain logic to read and write to portions of main memory 334. Using the memory controller(s) 332D which orders accesses to the main memory 334, portions of main memory 334 may be copied to one or more of the caches, e.g. first level cache(s), second level cache(s), and/or last level cache(s). The memory controller(s) 332D may utilize interleaving, e.g. for main memory 334 that is DRAM, to more efficiently read and write to main memory 340. For example, a memory controller 332 may read or write data respectively from or to a word of memory from each memory bank in successive order of the banks. Memory controller interleaving is dependent upon interleaving granularity and interleaving pattern. The interleaving granularity is a number of bits read or written at any time. Bits read or written in a granule reside in the corresponding memory controller. The interleaving pattern is defined by the number of memory controllers to be interleaved, and the interleaving granularity. The interleaving pattern is the order in which data is accessed, e.g. from ranks or banks. In one embodiment, the memory controller(s) 332D also refresh main memory 334 when it is dynamic memory such as DRAM. The I/O controller(s) 332F are coupled to at least one I/O (I/O(s)) 332G.

Program instructions (e.g. of the operating system 334A, the abstraction layer 334B, and the application(s) 334C) are stored in the main memory 334 which is non-transitory. At least a portion of the program instructions are read from the main memory 334 by the multicore processor 332 for execution on the USRQ cluster(s)) 332A. The program instructions are also referred to herein as "software". The main memory 334 may also store program instructions (and any related data) during execution by the USRQ cluster(s)) 332A. In other embodiments, other types of memory are used. Further, one embodiment, where a processing system includes multiple processing units, each processing unit has a separate memory dedicated to storing the program instructions during execution on the associated processing unit.

Optionally, in one implementation, the multicore processor computing system 300 includes a scheduling system 334A-1. In one embodiment, the scheduling system 334A-1 resides in the operating system 334A, such as in an ARINC 653 real time operating system; however, in other embodiments, the scheduling system 334A-1 can be located external to the operating system 334A. The scheduling system (scheduler) 334A-1 schedules the execution of program instructions on the USRQ cluster(s) 332A. In another embodiment, the scheduling system 334A-1 dynamically schedules the execution of program instructions. In further embodiment, the scheduler 334A-1 schedules the execution of program instructions according to a static time definition. For example, when the operating system conforms to ARINC 653, the execution of program instructions is assigned to dedicated time windows. Optionally, when a processing system includes multiple processing units, each processing unit may have an associated scheduler.

As described herein, the program instructions, stored within the main memory 334 may be organized into processes. Processes are scheduled for execution on the processing system by the scheduler 334A-1. Each instance when a process is scheduled for execution is referred to herein as a scheduled instance of a process. Further, a process may be composed of smaller sub-processes that execute within a scheduled instance of the process. In certain exemplary implementations, a process may be applied to a rate monotonic thread, a POSIX thread, or an ARINC 653 process. Thus, thread and process may be used interchangeably herein.

In certain embodiments, multiple process instances may be scheduled for execution within a scheduler instance. The scheduler instance is performed during a time period known as a major frame. A scheduler instance may be tied to a single core or multiple cores. When the scheduler instance is tied to multiple cores, a scheduling algorithm may select the core on which threads associated with the multicore scheduler instance execute. If no scheduler instance is associated with a core in a time window, processes may not be allowed to execute on the unscheduled core during the time window. Within a major frame, there may be multiple scheduler instances; however, each process may be handled by a single scheduler instance for the entire major frame.

Figure 4:
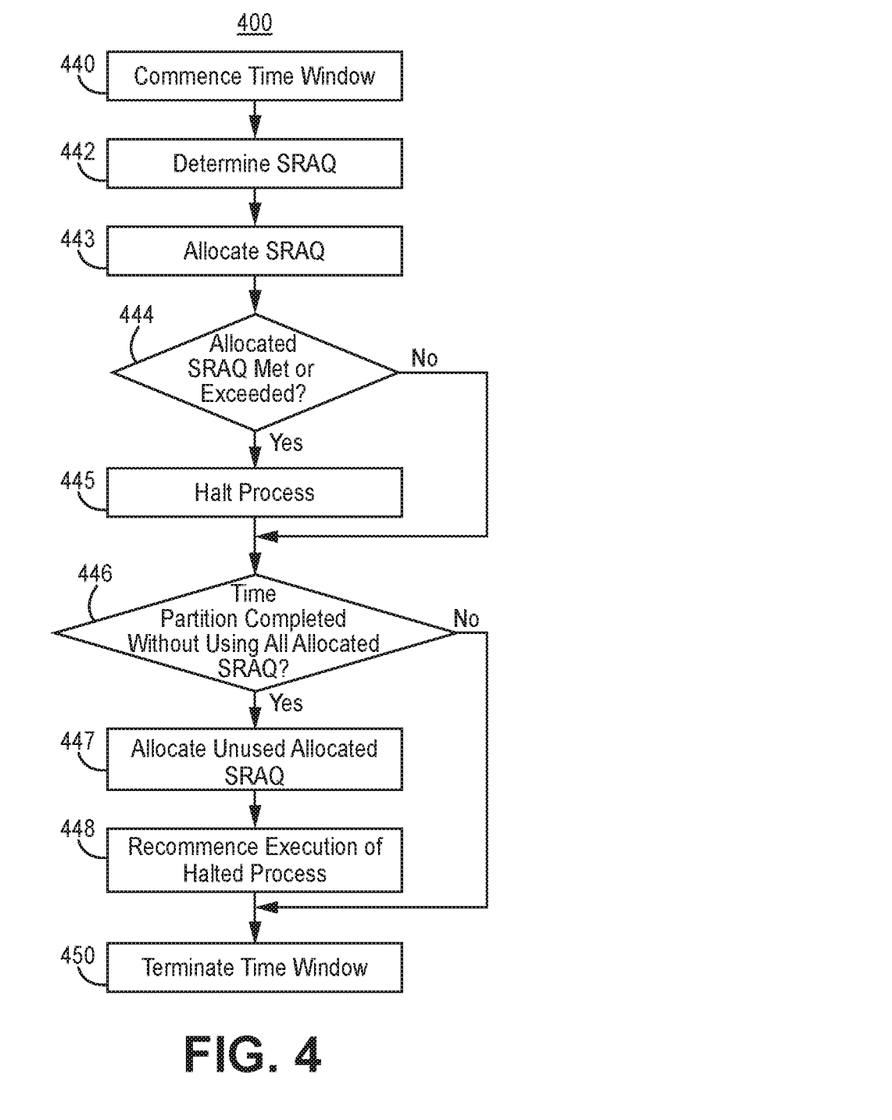
FIG. 4 is a flow diagram of a method for operating a multicore processing system having a shared resource access quota that can vary over time windows.

In certain implementations, where the processing system includes multiple processing units, the scheduler 334A-1 determines which processing unit in the processing system will execute a particular process. Also, the scheduler 334A-1 determines, at any given point in time, which processes are to be executed on each processing unit in the processing system. In determining how to schedule the execution of processes, the scheduler 334A-1 uses a scheduling algorithm or policy that provides rules and methods for determining how to schedule the execution of processes. For example, the scheduler 334A-1 may use scheduling algorithms such as rate monotonic, priority preemptive, and/or round robin. In one implementation of such an embodiment, the scheduler 334A-1 uses a single scheduling algorithm for scheduling the execution of the processes on the various processing units in the processing system. In another implementation, the scheduler 334A-1 uses multiple scheduling algorithms for scheduling the execution of the processes on the different processing units in the processing system. For example, in such alternative implementations, the scheduler 334A-1 uses a first scheduling algorithm to schedule some of the processes for execution on a first processing unit and a second scheduling algorithm for scheduling the execution of some of the processes for execution on a second processing unit in the processing system FIG. 4 is a flow diagram of a method 400 for operating a multicore processing system having a shared resource access quota that can vary over time windows. To the extent the method 400 shown in FIG. 4 is described herein as being implemented in the system shown in FIGS. 1-3, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 440, commence a time window. In block 442, determine, for the time window, a shared resource access quota (SRAQ) for at least one time partition, e.g. where each time partition is associated with one or more cores of the multicore processor. In block 443, allocate, for the time window, each of the determined resource access quotas to a corresponding time partitions. Optionally, the total shared resource access quota for all time partitions in a time window equals a percentage, e.g. five to fifty percent or twenty to thirty percent, of a maximum available shared resource access (i.e. corresponding to the maximum bandwidth of shared resource access) of the multicore processing system including the multicore processor. Optionally, the percentage may be selected by the multicore processing system designer and/or the system designer implementing applications to executed on the multicore processing system. The allocated shared resource access quota for each time partition during a time window may be equal or not equal. The allocated shared resource access quota for time partitions in a time window may be based on a static policy, e.g. by assigning specific percentages of the total shared resource access quota, and/or a dynamic policy, e.g. based upon the importance or priority of at least one of the processes to be executed in each time partition. Optionally, the total shared resource access quota and each time partition's allocated shared resource access quota is stored in the shared resource access evaluation hardware and/or software. Allocated shared resource access quotas for each time partition may vary from time window to time window.

Optionally, in block 444, determine if allocated shared resource access quota for any of the time partitions in the time window has been met or exceeded. If no, proceed to block 448. If yes, then in block 445 halt an executing process in a time partition that has met or exceeded its allocated SRAQ. Exemplary techniques to determine whether the allocated SRAQ are illustrated above. One or more time partitions may have executing processes halted during a time window for this reason.

Optionally, in block 446, determine if all process(es) in a time partition in a time window complete execution without using all of the SRAQ allocated to the time partition. If no, proceed to block 450. If yes, then in block 447, allocate the unused allocated SRAQ from at least one time partition to another time partition during the same time window. As discussed above, the allocation may be made between any time partitions and/or USRQ clusters during the same time window, or only between time partitions of the same USRQ cluster and in the same time window. Exemplary techniques are further described above. Unused allocated SRAQ may be allocated from more than one time partition to one or more time partitions during a time window. Unused allocated SRAQ may be allocated, at different times, from different time partitions to another time partition during a time window. Allocation of unused allocated SRAQ may be made pursuant to a static and/or dynamic policy which are described elsewhere herein.

Optionally, in block 448, recommence execution of a halted process in at least one time partition, in the time window, to which the unused shared resource allocated quota has been allocated. In some embodiments, one or more of blocks 444, 448 and/or 448 are performed more than once during a time window. In block 450, terminate time window, e.g. when processes of all time partitions in the time window have either been halted due to throttling or have completed execution. Optionally, return to block 440.

Example Embodiments

Example 1 includes a method, comprising: commencing a time window, where the time window has a fixed or variable time duration; determining a shared resource access quota for at least one time partition for the time window, where the shared resource access quota may vary by time window; allocating each determined shared resource access quota to a corresponding time partition for the window; determining if allocated shared resource access quota for any time partition in the time window has been met or exceeded; and if an allocated shared resource access quota for a time partition in the time window has been met or exceeded, then halting an executing process in the time partition.

Example 2 includes the method of Example 1, further comprising if all of at least one process in a time partition in a time window completed execution without using all of the shared resource access quota allocated to the time partition, then allocating the unused shared resource access quota from at least one time partition to at least one other time partition during the same time window.

Example 3 includes the method of Examples 1-2, wherein allocating the unused shared resource access quota comprises allocating the unused shared resource access quota to at least one other time partition in the same USRQ cluster as the time partition.

Example 4 includes the method of Example 3, further comprising resuming a process in at least one time partition in the time window to which the unused shared resource access quota has been allocated.

Example 5 includes the method of any of Examples 1-4, wherein determining the shared resource access quota comprises determining a shared resource access quota of each time partition using at least one of a static policy and a dynamic policy.

Example 6 includes the method of any of Examples 2-5, wherein allocating the unused shared resource access quota comprises allocating the unused shared resource access quota using at least one of a dynamic policy and a static policy.

Example 7 includes a non-transitory computer readable medium storing a program causing a computer to perform a method, the method comprising: commencing a time window, where the time window has a fixed or variable time duration; determining a shared resource access quota for at least one time partition for the window, where the shared resource access quota may vary by time window; allocating each determined shared resource access quota to a corresponding time partition for the window; determining if allocated shared resource access quota for any time partition in the time window has been met or exceeded; and if an allocated shared resource access quota for a time partition in the time window has been met or exceeded, then halting an executing process in the time partition.

Example 8 includes the non-transitory computer readable medium of Example 7, further comprising if at least one process in a time partition in a time window completed execution without using all of the shared resource access quota allocated to the time partition, then allocating the unused shared resource access quota from at least one time partition to at least one other time partition during the same time window.

Example 9 includes the non-transitory computer readable medium of Example 8, wherein allocating the unused shared resource access quota comprises allocated the unused shared resource access quota to at least one other time partition in the same USRQ cluster as the time partition.

Example 10 includes the non-transitory computer readable medium of Example 9, further comprising resuming a process in at least one time partition in the time window to which the unused shared resource access quota has been allocated.

Example 11 includes the non-transitory computer readable medium of any of Examples 7-10, wherein determining the shared resource access quota comprises determining a shared resource access quota of each time partition using at least one of a static policy and a dynamic policy.

Example 12 includes the non-transitory computer readable medium of any of Examples 8-11, wherein allocating the unused shared resource access quota comprises allocating the unused shared resource access quota using at least one of a dynamic policy and a static policy.

Example 13 includes a processing system, comprising: at least two processing circuits; memory; wherein the memory comprises an operating system and at least one application; a data bus coupling the memory to the at least two processing units; wherein at least one processing circuit is configured to execute at least one process of the at least one application; and wherein at least one of the at least two processing circuits, executing the operating system, is configured to: commence a time window, where the time window has a fixed or variable time duration; determine a shared resource access quota for at least one time partition for the window, where the shared resource access quota may vary by time window; allocate each determined shared resource access quota to a corresponding time partition for the window; determine if allocated shared resource access quota for any time partition in the time window has been met or exceeded; and if an allocated shared resource access quota for a time partition in the time window has been met or exceeded, then halt an executing process in the time partition.

Example 14 includes the processing system of Example 13, wherein if at least one process in a time partition in a time window completed execution without using all of the shared resource access quota allocated to the time partition, then the processing circuit is further configured to allocate the unused shared resource access quota from at least one time partition to at least one other time partition during the same time window.

Example 15 includes the processing system of Example 14, wherein allocate the unused shared resource access quota comprises allocate the unused shared resource access quota to at least one other time partition in the same USRQ cluster as the time partition.

Example 16 includes the processing system of Example 15, further comprising the processing circuit configured to resume a process in at least one time partition in the time window to which the unused shared resource access quota has been allocated.

Example 17 includes the processing system of any of Examples 13-16, wherein determine the shared resource access quota comprises determine a shared resource access quota of each time partition using at least one of a static policy and a dynamic policy.

Example 18 includes the processing system of any of Examples 14-17, wherein allocate the unused shared resource access quota comprises allocating the unused shared resource access quota using at least one of a dynamic policy and a static policy.

Example 19 includes the processing system of any of Examples 13-18, wherein the at least two processing units comprise at least one event counter for each processing unit.

Example 20 includes the processing system of any of Examples 13-19, further comprising: an interconnect coupled to each processing circuit; at least one memory controller coupled to the interconnect and the data bus; and wherein each processing circuit is at least one core of a multicore processor.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method, comprising:
   commencing a time window, where the time window has a fixed or variable time duration;
   determining a shared resource access quota for at least one time partition in the time window, where the shared resource access quota for at least one time partition in the time window may vary from time window to time window, where each shared resource is configured to be utilized by cores of a multicore processing system, where the shared resource access quota of at least one time partition in the time window is a measure of a number of accesses to shared resources during the at least one time partition in the time window, and where a time partition occurs in one or more time windows;
   allocating each determined shared resource access quota to a corresponding time partition in the time window;
   determining if an allocated shared resource access quota of any time partition in the time window has been met or exceeded;
   upon determining that an allocated shared resource access quota of a time partition in the time window has been met or exceeded, then halting a process executing on a core associated with the time partition in the time window; and
   determining that all of at least one process in a time partition in the time window completed execution without using all of the shared resource access quota allocated to the time partition, and then allocating the unused shared resource access quota from at least one time partition to at least one other time partition in the same time window.

2. The method of claim 1, wherein allocating the unused shared resource access quota comprises allocating the unused shared resource access quota to the at least one other time partition in a same unused shared resource access quota cluster as the time partition.

3. The method of claim 2, further comprising resuming a process in the at least one time partition in the time window to which the unused shared resource access quota has been allocated.

4. The method of claim 1, wherein determining the shared resource access quota comprises determining a shared resource access quota of each time partition using at least one of a static policy and a dynamic policy.

5. The method of claim 1, wherein allocating the unused shared resource access quota comprises allocating the unused shared resource access quota using at least one of a dynamic policy and a static policy.

6. A non-transitory computer readable medium storing a program causing a computer to perform a method, the method comprising:
   commencing a time window, where the time window has a fixed or variable time duration;
   determining a shared resource access quota for at least one time partition in the time window, where the shared resource access quota for the at least one time partition in the time window may vary from time window to time window, where each shared resource is configured to be utilized by cores of a multicore processing system, where the shared resource access quota of at least one time partition in the time window is a measure of a number of accesses to shared resources during the at least one time partition in the time window, and where a time partition occurs in one or more time windows;
   allocating each determined shared resource access quota to a corresponding time partition in the time window;
   determining if an allocated shared resource access quota of any time partition in the time window has been met or exceeded;
   upon determining that an allocated shared resource access quota of a time partition in the time window has been met or exceeded, then halting an executing process executing on a core associated with the time partition in the time window; and
   determining that at least one process in a time partition in the time window completed execution without using all of the shared resource access quota allocated to the time partition, and then allocating the unused shared resource access quota from at least one time partition to at least one other time partition in the same time window.

7. The non-transitory computer readable medium of claim 6, wherein allocating the unused shared resource access quota comprises allocating the unused shared resource access quota to the at least one other time partition in a same unused shared resource access quota cluster as the time partition.

8. The non-transitory computer readable medium of claim 7, wherein the method further comprises resuming a process in the at least one time partition in the time window to which the unused shared resource access quota has been allocated.

9. The non-transitory computer readable medium of claim 6, wherein determining the shared resource access quota comprises determining a shared resource access quota of each time partition using at least one of a static policy and a dynamic policy.

10. The non-transitory computer readable medium of claim 6, wherein allocating the unused shared resource access quota comprises allocating the unused shared resource access quota using at least one of a dynamic policy and a static policy.

11. A processing system, comprising:
at least two processing circuits;
memory;
wherein the memory comprises an operating system and at least one application;
a data bus coupling the memory to the at least two processing units;
wherein at least one processing circuit is configured to execute at least one process of the at least one application; and
wherein at least one processing circuit of the at least two processing circuits, executing the operating system, is configured to:
commence a time window, where the time window has a fixed or variable time duration;
determine a shared resource access quota for at least one time partition in the time window, where the shared resource access quota for the at least one time partition in the time window may vary from time window to time window, where each shared resource is configured to be utilized by cores of a multicore processing system, where the shared resource access quota of at least one time partition in the time window is a measure of a number of accesses to shared resources during the at least one time partition in the time window, and where a time partition occurs in one or more time windows;
allocate each determined shared resource access quota to a corresponding time partition in the time window;

determine if an allocated shared resource access quota of any time partition in the time window has been met or exceeded; and
upon determining that an allocated shared resource access quota of a time partition in the time window has been met or exceeded, then halt process executing on a core associated with the time partition in the time window; and
determine that all of at least one process in a time partition in the time window completed execution without using all of the shared resource access quota allocated to the time partition, and then allocate the unused shared resource access quota from the time partition to at least one other time partition in the same time window.

12. The processing system of claim 11, wherein allocate the unused shared resource access quota comprises allocate the unused shared resource access quota to the at least one other time partition in a same unused shared resource access quota cluster as the time partition.

13. The processing system of claim 12, wherein the at least one processing circuit is further configured to resume a process in the at least one time partition in the time window to which the unused shared resource access quota has been allocated.

14. The processing system of claim 11, wherein determine the shared resource access quota comprises determine a shared resource access quota of each time partition using at least one of a static policy and a dynamic policy.

15. The processing system of claim 11, wherein allocate the unused shared resource access quota comprises allocating the unused shared resource access quota using at least one of a dynamic policy and a static policy.

16. The processing system of claim 11, wherein the at least two processing units each comprise at least one event counter.

17. The processing system of claim 11, further comprising:
an interconnect coupled to each processing circuit; and
at least one memory controller coupled to the interconnect and the data bus;
wherein each processing circuit comprises at least one core of a multicore processor.

* * * * *

UNITED STATES PATENT AND TRADEMARK OFFICE
CERTIFICATE OF CORRECTION

PATENT NO. : 10,908,955 B2  
APPLICATION NO. : 15/928656  
DATED : February 2, 2021  
INVENTOR(S) : Srivatsan Varadarajan et al.

It is certified that error appears in the above-identified patent and that said Letters Patent is hereby corrected as shown below:

In the Claims

Column 16, Claim 6, Line 52, please replace "halting an executing process" with --halting a process--

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*